United States Patent
Luby

(10) Patent No.: US 8,131,867 B1
(45) Date of Patent: Mar. 6, 2012

(54) DYNAMIC LAYER CONGESTION CONTROL FOR MULTICAST TRANSPORT

(75) Inventor: Michael G. Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2497 days.

(21) Appl. No.: 09/587,542

(22) Filed: Jun. 1, 2000

(51) Int. Cl.
*G06F 15/16* (2006.01)
*H04L 12/128* (2006.01)

(52) U.S. Cl. ........ 709/232; 709/230; 709/231; 709/233; 709/238; 709/235; 370/254; 370/229

(58) Field of Classification Search .................. 709/238, 709/235, 224, 230–233; 370/254, 229
See application file for complete search history.

(56) References Cited

U.S. PATENT DOCUMENTS 4,365,338 A 12/1982 McRae et al.
(Continued)

FOREIGN PATENT DOCUMENTS

EP 0 854 650 A2 7/1998
(Continued)

OTHER PUBLICATIONS

Vicisano, L; Crowcroft, J; and Rizzo, L. "TCP-like Congestion Control for Layered Multicast Data Transfer." IEEE. 1998, pp. 996-1003.*

(Continued)

*Primary Examiner* — Alina N. Boutah
(74) *Attorney, Agent, or Firm* — Jeffrey D. Jacobs

(57) ABSTRACT

A multicasting system provides congestion control for multicasting using a dynamic layer scheme, where the aggregate sending rates of layers decline over time. Multicast packets are transmitted to layers that are joined by at least one host. A host maintains a reception rate by joining additional layers as the sending rates decline, a host reduces the reception rate by not joining additional layers as fast as the sending rates decline, thus allowing rate reduction even if the sender does not receive leave messages sent from a host.

12 Claims, 14 Drawing Sheets

U.S. PATENT DOCUMENTS

| | | | |
|---|---|---|---|
| 5,379,297 A | | 1/1995 | Glover et al. |
| 5,432,787 A | | 7/1995 | Chethik |
| 5,608,738 A | | 3/1997 | Matsushita |
| 5,617,541 A | | 4/1997 | Albanese et al. |
| 5,659,614 A | | 8/1997 | Bailey, III |
| 5,805,825 A | | 9/1998 | Danneels et al. |
| 5,822,523 A | * | 10/1998 | Rothschild et al. ............ 709/236 |
| 5,835,165 A | | 11/1998 | Keate et al. |
| 5,889,794 A | | 3/1999 | Mo et al. |
| 5,903,775 A | | 5/1999 | Murray |
| 5,905,871 A | * | 5/1999 | Buskens et al. ............... 709/245 |
| 5,936,949 A | | 8/1999 | Pasternak et al. |
| 5,983,383 A | | 11/1999 | Wolf |
| 5,992,737 A | | 11/1999 | Kubota |
| 5,993,056 A | | 11/1999 | Vaman et al. |
| 6,011,590 A | | 1/2000 | Saukkonen |
| 6,049,878 A | * | 4/2000 | Caronni et al. ............... 713/201 |
| 6,073,250 A | | 6/2000 | Luby et al. |
| 6,081,909 A | | 6/2000 | Luby et al. |
| 6,081,918 A | | 6/2000 | Spielman |
| 6,104,757 A | * | 8/2000 | Rhee ........................ 375/240.12 |
| 6,141,053 A | | 10/2000 | Saukkonen |
| 6,148,005 A | * | 11/2000 | Paul et al. ..................... 370/469 |
| 6,163,870 A | | 12/2000 | Luby et al. |
| 6,178,536 B1 | | 1/2001 | Sorkin |
| 6,185,265 B1 | | 2/2001 | Campanella |
| 6,195,777 B1 | | 2/2001 | Luby et al. |
| 6,208,647 B1 | * | 3/2001 | Deng et al. .................... 370/390 |
| 6,212,657 B1 | | 4/2001 | Wang et al. |
| 6,233,017 B1 | * | 5/2001 | Chaddha .................. 375/240.12 |
| 6,292,514 B1 | | 9/2001 | Yamaguchi et al. |
| 6,307,487 B1 | | 10/2001 | Luby |
| 6,320,520 B1 | | 11/2001 | Luby |

FOREIGN PATENT DOCUMENTS

| | | |
|---|---|---|
| WO | WO 96 34463 A | 10/1996 |
| WO | WO 01/57667 A1 | 8/2001 |
| WO | WO 01/58130 A2 | 8/2001 |
| WO | WO 01/58131 A2 | 8/2001 |

OTHER PUBLICATIONS

McCanne, S; Vetterli, M; and Jacobson, V. "Receiver-driven Layered Multicast." ACM SIGCOMM, 1996, pp. 1-14.*

Kaur, S; Madan, B; and Ganesan, S. "Multicast Support for Mobile IP Using a Modified IGMP." IEEE, 1999, pp. 948-952.*

Alon, et al., "Linear Time Erasure Codes With Nearly Optimal Recovery," Proceedings Of The Annual Symposium On Foundations Of Computer Science, US, Los Alamitos, IEEE Comp. Soc. Press, vol. Symp. 36, pp. 512-516 (Oct. 23, 1995), XP 000557871.

Bigloo, et al. "A Robust Rate-Adaptive Hybrid ARQ Scheme for Frequency-Hopped Spread-Spectrum Multiple-Access Communication Systems" IEEE Journal On Selected Areas In Communications, US, IEEE Inc, New York, (Jun. 1, 1994) pp. 917-924, XP0000464977.

Blömer, et al., "An XOR-Based Erasure-Resilient Coding Scheme," ICSI Technical Report No. TR-95-048 (1995) [avail. at ftp://ftp.icsi.berkeley.edu/pub/techreports/1995/tr-95-048.pdf].

Byers, et al., "A Digital Fountain Approach to Reliable Distribution of Bulk Data", International Computer Science Institute Technical Report TR-98-013 (May 1998) [available at ftp://ftp.icsi.berkeley.edu/pub/techreports/1998/tr-98-013.pdf].

Byers, et al., "Accessing Multiple Mirror Sites in Parallel: Using Tornado Codes to Speed Up Downloads," International Computer Science Institute Technical Report TR-98-021 (1998) [available at http://www.icsi.berkeley.edu/~luby/PAPERS/mirrdown.ps].

Byers, et al. "Accessing Multiple Mirror Sites in Parallel: Using Tornado Codes to Speed Up Downloads" Proceeding IEEE Infocom. The Conference On Computer Communications, US New York, (Mar. 21, 1999) pp. 275-283, XP000868811.

Esaki, et al. "Reliable IP Multicast Communication Over ATM Networks Using Forward Error Correction Policy" IEICE Transactions On Communications, JP, Institute of Electronics Information and Comm. ENG. Tokyo, vol. E78-V, No. 12, (Dec. 1995), pp. 1622-1637, XP000556183.

Luby, et al., "Analysis of Low Density Codes and Improved Designs Using Irregular Graphs", International Computer Science Institute Technical Report TR-97-045 (Nov. 1997) [available at ftp://ftp.icsi.berkeley.edu/pub/techreports/1997/tr-97-045.pdf].

Luby, et al., "Analysis of Random Processes via And-Or Tree Evaluation," ICSI Technical Report No. TR-97-042 (1997) and Proceedings of the 9th Annual ACM Symposium on Discrete Algorithms (1998) [available at ftp://ftp.icsi.berkeley.edu/pub/techreports/1997/tr-97-042.pdf].

Luby, et al., "Improved Low-density Parity-Check Codes Using Irregular Graphs and Belief Propagation", International Computer Science Institute Technical Report TR-97-044 (Nov. 1997) [available at ftp://ftp.icsi.berkeley.edu/pub/techreports/1997/tr-97-044.pdf].

Luby, et al., "Tornado Codes," Practical Loss-Resilient Codes, 29th Annual ACM Symposium on Theory of Computing (1997).

Pursley, et al. "Variable-Rate Coding for Meteor-Burst Communications" IEEE Transactions on Communications, US, IEEE Inc. New York (1989) vol. 37, No. 11, pp. 1105-1112, XP000074533.

Seshan el al. "Handoffs in Cellular Wireless Networks: The Daedalus Implementation and Experience" Wireless Personal Communications, NL, Kluwer Academic Publishers, vol. 4, No. 2, Mar. 1, 1997, pp. 141-162, XP000728589.

Shacham, N., "Packet Recovery And Error Correction in High-Speed Wide-Area Networks," Proceedings Of The Military Communications Conference. (Milcom), US, New York, IEEE, vol. 1, pp. 551-557, (1989), XP 000131876.

Vicisano, et al., "TCP-like Congestion Control for Layered Multicast Data Transfer", IEEE Infocom '98 (San Francisco, CA, Mar. 28-Apr. 1, 1998).

McCanne, et al., "Receiver-Driven Layered Multicast", *Proc. ACM SIGCOMM*, pp. 117-130 (Stanford, CA, Aug. 1996).

* cited by examiner

DYNAMIC LAYER CONGESTION CONTROL FOR MULTICAST TRANSPORT

FIELD OF THE INVENTION

The present invention relates to methods and apparatus for reducing data traffic in networks that carry data to multiple recipients via multicast transmission or similar transmission mechanisms.

BACKGROUND OF THE INVENTION

"Multicasting" is best described by distinguishing it from "unicasting" and "broadcasting". A network typically comprises a plurality of nodes and a plurality of paths interconnecting the nodes. The network provides for data flow between nodes of the network. In most networks, each node is identified by an address, and data (generally in the form of a packet) destined for a particular node is "addressed" to that node. "Unicast data" refers to data destined for a single node and a "unicast address" refers to the address of that node. "Broadcast data" refers to data destined for all nodes in a network and broadcast addresses are special addresses reserved for broadcast data. Multicast data is data destined for a subset of nodes on the network using addresses reserved for multicasting. Unlike the nodes associated with unicast and broadcast addresses, the set of nodes associated with a multicast address may change dynamically, as nodes subscribe to and leave the multicast groups associated with multicast addresses.

The most widespread network today is the global internetwork of networks called the "Internet" (with a capitalized "I"). The Internet is a packet-based network, in that data sent to a destination node is bundled in packets, with each packet including a destination address, a source address, the data payload, and other fields, all according to the well-known Internet Protocol ("IP"). While the Internet is generally thought of as the global, publicly accessible network with which individuals, organizations, and business entities can connect to other individuals, organizations, and business entities around the world, the Internet Protocol is also used for networks that might be distinct from the Internet, such as an internal corporate network ("intranet"), a local area network ("LAN"), and other well-known variations of networks operating according to the Internet Protocol. Of course, many concepts that apply to IP networks may apply just as well to other types of networks. It should be understood that an IP network is used here as an example and not an exclusive example.

In an IP network, each node has an address, referred to as its "IP address". In the current implementation, an IP address is four octets (i.e., four 8-bit values), but work is being done on moving to IPv6 (version 6), where IP addresses comprise sixteen octets. To send a packet from a sending node to a destination node, the sending node creates an IP packet according to the IP protocol, and according to that protocol, the packet contains the IP address of the sending node and the IP address of the destination node. In an IP network with a small number of nodes, a sender can send packets addressed with a broadcast IP address, but if that IP network is coupled to the Internet or other large network, broadcasting even one packet to the millions of nodes coupled to the Internet is impractical, wasteful and would probably result in the sender's node or network being isolated from the greater network.

Fortunately, the IP protocol provides a mechanism that achieves a result similar to broadcasting without a packet having to be received by millions of nodes that are uninterested in receiving the packet. The IP address space currently comprises $2^{32}$, or 4,294,967,296, unique addresses (and IPv6 will comprise $2^{128}$ addresses). Some of these addresses are used for network control, while others are addresses of specific individual nodes ("unicast" addresses), while still others are referred to as "multicast" addresses. If a sender wants to send a packet to one particular destination node, the sender sets the destination address of the packet to the IP unicast address of that particular destination. However, if the sender wants to send a packet to many destinations, the sender can either send one distinct copy of the packet out for each of the destinations, with one copy of the packet being directed to each unicast address, or the sender can send a single copy of the packet to a multicast address. (The packet may later be copied as it is distributed across the network to the appropriate destinations; however, multicast is designed to make copies only when necessary, and hence is much more efficient.) We refer to the set of destinations associated with this multicast address as a multicast group. The multicast group does not need to be static over time; nodes may join or leave the multicast group. Joining is a process of indicating an interest in receiving packets that might be sent to that multicast group. In the simplest implementation, each multicast group has a multicast IP address and packets sent from a sender addressed to that multicast IP address are routed to nodes that have joined the multicast group.

One of the benefits of multicasting over broadcasting is that multicast packets do not need to be routed over branches of the network or paths that do not contain any nodes that are members of the multicast group. The multicasting process is far from simple, complicated by a number of factors, including the fact that multiple protocols must act in concert to deliver multicast packets to their destinations; there is no central location where the members of the multicasting group are listed and controlled; and evolving standards change multicasting requirements over time. Many difficulties of multicasting are well-known and documented so they need not be enumerated here.

In a conventional multicast environment, multicast protocols can be used to handle session management. With multicasting, an active multicast address must be associated with, or bound to, the set of nodes that are intended recipients of data transmitted over that address. Potential members of the group would typically use the IGMP (Internet Group Management Protocol) protocol to communicate with the last hop device to join and leave ongoing groups. Last hop devices are the last network devices along the path from the sender to hosts that fully support Internet Protocols (IP).

Because of the way IGMP joins and leaves are implemented (e.g., reception of join and leave messages by the last hop device is not guaranteed by the network), typically the last hop device has no reliable way to keep track of how many hosts are joined to a particular group, and therefore must poll the hosts to see if any are still joined to the group before stopping the flow of packets for the group. For example, if the last link is a point-to-point connection, then the last hop access device can immediately stop the flow as soon as it receives an IGMP leave, as it knows this comes from the only host along that interface. However, if the last link is a LAN, then there could be hundreds or even thousands of hosts beyond the link. In this case, polling to see which hosts are still attached is required and that polling can take several seconds to resolve, usually because the polling packets are not necessarily reliable.

To make the polling reliable, a series of three polls are made before stopping flow of the group, and each poll can take from one to three seconds in current implementations of last hop devices, leading to an aggregate leave reaction time of between three and nine seconds. In this time, even if all hosts have left the group and have no further interest in receiving multicast packets, the last hop device will continue to send the multicast data, until the last hop device is able to infer (from lack of response to the polling packets) that there are no group members left, resulting in much data being passed over the network without any node desiring that data. Thus, the slow leave latency of multicasting is a problem for networks that need to be used efficiently.

Overview of Layer-Based Multicast Content Delivery

Multicast layering enables the same content to be transmitted concurrently over multiple multicast sessions. One advantage to layering is that the transmission rates can vary widely over the different layers, which enables receivers with heterogeneous receive rates (modem, cable-modem, DSL, T1) to subscribe to the appropriate multicast group. In layer-based multicast transfers, the traffic destined for multicast groups is distributed among a plurality of layers. Having different layers with different send rates allows hosts with different receive rate capabilities to receive the multicast stream without stalling the network as a router waits for the slowest host to receive packets. Some solutions have been proposed to deal with layered multicasts. See, for example, L. Vicisano, et al., "TCP-like Congestion Control for Layered Multicast Data Transfer", IEEE Infocom '98 (San Francisco, Calif., Mar. 28-Apr. 1, 1998).

Layered multicast congestion control affords the crucial ability to adjust one's receive rate dynamically based on network availability. Most instantiations of layered multicast allow receivers to accumulate layers, implying that a single receiver may subscribe to multiple layers simultaneously. The multicast layers associated with content are usually ordered consecutively from a lowest layer to a highest layer. A "cumulative layer" scheme is one where a receiver can only increase its reception rate by joining the lowest layer to which it is not currently joined and can only decrease its reception rate by leaving the highest layer to which it is currently joined. For example, suppose the rates of a six layer cumulative scheme are 10 Kbps (kilobits per second), 10 Kbps, 20 Kbps, 40 Kbps, 80 Kbps and 160 Kbps. A receiver may be joined to any consecutive set of these layers that includes the first layer. For example, a receiver may be joined to and receiving from the first three layers, at which point the reception rate is 40 Kbps. If the receiver wants to increase its rate at this point, it may do so only by joining the next layer, layer four, to increase its rate by 40 Kbps to 80 Kbps. If after this the receiver wishes to decrease its rate, it may do so only by leaving the top layer, layer four, to decrease its rate by 40 Kbps from 80 Kbps down to 40 Kbps. Thus, the number of different rates that a receiver can receive at using a cumulative scheme is limited to the number of different layers in the scheme.

A "relaxed layer" scheme is a generalization of a cumulative layer scheme, wherein receivers are allowed to join and leave arbitrary layers. A relaxed layer scheme may offer advantages over a cumulative layer scheme, such as more fine-grained control over the possible reception rates. Specifically, in a cumulative layer scheme, there are generally fewer possibilities for the reception rates than in a relaxed layer scheme with the same number of layers. Hence in a relaxed layer scheme a receiver can tune their reception rate more exactly to its needs. For example, suppose the rates of a six layer scheme are 10 Kbps, 20 Kbps, 40 Kbps, 70 Kbps, 120 Kbps, and 200 Kbps, respectively. Suppose further that a receiver is currently joined to and receiving the first three layers, so the aggregate reception rate of that receiver is currently 70 Kbps. If the receiver wants to increase its rate by 10 Kbps, it can achieve this with a relaxed scheme by leaving the second and third layers and joining the fourth layer, thus increasing its reception rate by 70 Kbps-40 Kbps-20 Kbps=10 Kbps. By carefully choosing the rates of the different layers, with a relaxed scheme the receiver can receive at many more rates than the number of different layers, and thus exercise much finer grain control over the aggregate reception rate. This is a key advantage of a relaxed scheme over a cumulative scheme.

From the above example of a relaxed scheme, it is evident that the rates on the different layers can be designed so that the difference between consecutive achievable reception rates is always the same small amount x (x=10 Kbps in the example above), and so that the number of joins and leaves needed to increase the reception rate by x is a small constant. For example, the six layer relaxed scheme described above can be generalized so that the rate of the first layer is x, the rate of the second layer is x, and in general, the rate of the i-th layer is equal to the sum of the rates of layers i−1 and i−2 plus x. Then, to increase the reception rate by x, the receiver joins the smallest layer not currently joined and leaves the two previous layers (if they both exist).

A disadvantage of a relaxed scheme versus a cumulative scheme is that it is harder with the relaxed scheme compared to the cumulative scheme to synchronize all receivers behind a bottleneck link to be joined to exactly the same set of layers. This is an issue because it means that although all the flow from the layers going through the bottleneck link is of use to all the receivers behind the bottleneck link, not all of them are receiving all of this flow if they are joined to different subsets of the layers.

An issue with both layered schemes is that data put into the different layers must be carefully orchestrated to' ensure that receivers can in fact recover all of the transmitted content, preferably without receiving duplicated data. In practice, this can be very difficult to achieve. In the setting of reliable content distribution, the layering mechanisms and congestion control techniques described in U.S. Pat. No. 6,307,487 (application Ser. No. 09/246,015, entitled "Information Additive Code Generator And Decoder For Communication Systems" and filed Feb. 5, 1999) (hereinafter "Luby I") and U.S. Pat. No. 6,320,520 (application Ser. No. 09/399,201, entitled "Information Additive Group Code Generator And Decoder For Communication Systems" and filed Sep. 17, 1999) (hereinafter "Luby II"), each of which is incorporated by reference herein for all purposes, might be used to accomplish reliable content distribution with negligible overhead in terms of duplicated data.

Even with careful orchestration, the slowness of leave requests induces significant wasted traffic in layered multicast schemes. A receiver may wish to leave a layer, either when the receiver has received all of the relevant data from that layer or, more commonly, when lowering the receive rate is in response to dynamically changing network congestion conditions. The leave operation is meant to signal that the receiver no longer desires packets for the corresponding layer. Because leave times have high latency, packets may continue to be sent to the receiver over that layer long after the leave request is initiated and until the leave request is fully processed. These packets may be wasted, in that there may be no downstream node that requires or desires these packets, but they are sent and consume network resources. Indeed, these wasted packets may have a severe impact on network performance, if the leave was initiated in response to network congestion.

SUMMARY OF THE INVENTION

The present invention addresses several of the above-described shortcomings of the prior art. A multicasting method and apparatus according to the present invention organizes multiple multicast streams emanating from a single server into layers, where the send (transmission) rate varies among the layers, with each subsequent layer typically providing a larger aggregate send rate than the aggregate send rate of the previous layers. In one embodiment of a multicast network according to the present invention, recipients of a multicast join and leave layers of the multicast, with each layer having a send rate such that a recipient can adjust to a desired aggregate receive rate by selecting one or more layers so that the sum of the send rates of the selected layers is at least approximately the desired aggregate receive rate. When a recipient joins or leaves a layer, the recipient sends the appropriate message toward a source of the multicast indicating the join or leave. The send, rates of the layers are dynamic, changing over time.

The dynamic layers have send rates that are generally changing over time, eventually going to zero. With such layers, the recipient continues to join new dynamic layers as the aggregate rate for recipient's current layers is reduced if the recipient wants to maintain a relatively constant receive rate. To leave a connection, the recipient abstains from joining new dynamic layers and then sends leave messages for current layers. If the leave messages take considerable time to process, the aggregate send rate of the current layers eventually reduce to zero even if the sender is not aware that no interested recipients remain. Thus, the aggregate reception rate of receivers will fall if there are no receivers to keep up the connection, even if leave messages take considerable time to process, in effect creating a passive leave mechanism where the leaves takes effect quickly, as opposed to requiring an explicit leave request that may take considerable time to take effect.

One advantage of the present invention is that the amount of wasted traffic is significantly reduced because the send rates decrease automatically in response to passive behavior and therefore the rate of packets delivered to recipients decrease automatically in response to passive behavior. Hence, the wasted packet delivery will be lower than in a system with long leave latency at the times when a last recipient leaves a multicast group or a multicast layer. This advantage leads to better utilization of network resources.

A related advantage of the present invention is that passive leaves yield significant improvement in multicast responsiveness to network congestion. Long leave latencies imply that multicast traffic cannot effectively respond to changing network conditions, leading to instability in network conditions and unfair behavior of multicast streams in comparison with other network traffic, such as TCP streams. The improved responsiveness of passive leaves therefore greatly improves the desirability of using multicast on large heterogeneous networks such as the Internet.

In the typical embodiment, no changes are required of networking components, only changes in the behavior of senders and receivers, so standard networking components can be used.

A further understanding of the nature and the advantages of the inventions disclosed herein may be realized by reference to the remaining portions of the specification and the attached drawings.

DESCRIPTION OF THE PREFERRED EMBODIMENTS

In the examples described herein, methods and apparatus for dynamic layer congestion control are described. An example is described below with an example network configuration, but a person of ordinary skill in the art will be able to apply the teachings of the example to many other configurations, after reading the disclosure herein.

As used herein, the term "session" refers to period of time in which one or more receivers subscribe to a multicast group or a set of layered multicast groups associated with transmission of a single piece of content. A "static layer scheme" refers to a layer scheme where the send rate of each layer (i.e., the packet transmission rate from the server to the receiver) remains steady for the duration of the session, whereas "dynamic layer scheme" refers to a layer scheme where the send rates can vary over the duration of the session. If the transmission rates on some layers remain constant but varies on other layers over the duration of a session, then the layering scheme is still considered a dynamic layering scheme.

Two general translations from static layer schemes to dynamic layer schemes are described below, one that applies to both cumulative and relaxed layer schemes and the other to the more restricted class of cumulative layer schemes. As will be apparent from this disclosure, the dynamic layer schemes described herein often eliminate problems with large and variable leave latencies.

When a receiver (an IP-addressed host or other recipient) joins and leaves a multicast group, the acts of joining and leaving are communicated to the network via join messages and leave messages. Where the network is the Internet, the join and leave messages are typically sent according to the IGMP protocol. It is well recognized that IGMP leave latencies can be highly variable, and can vary depending on the network configuration by an order of magnitude, because there is an inherent asymmetry between leaves and joins. Join latency is defined to be the amount of time between when a host sends an IGMP join message towards the sender and when the first multicast packet addressed to that group arrives at the host. Similarly, leave latency is defined to be the amount of time between when a host sends an IGMP leave message towards the sender and when the last multicast packet addressed to that group arrives at the host.

Figure 1:
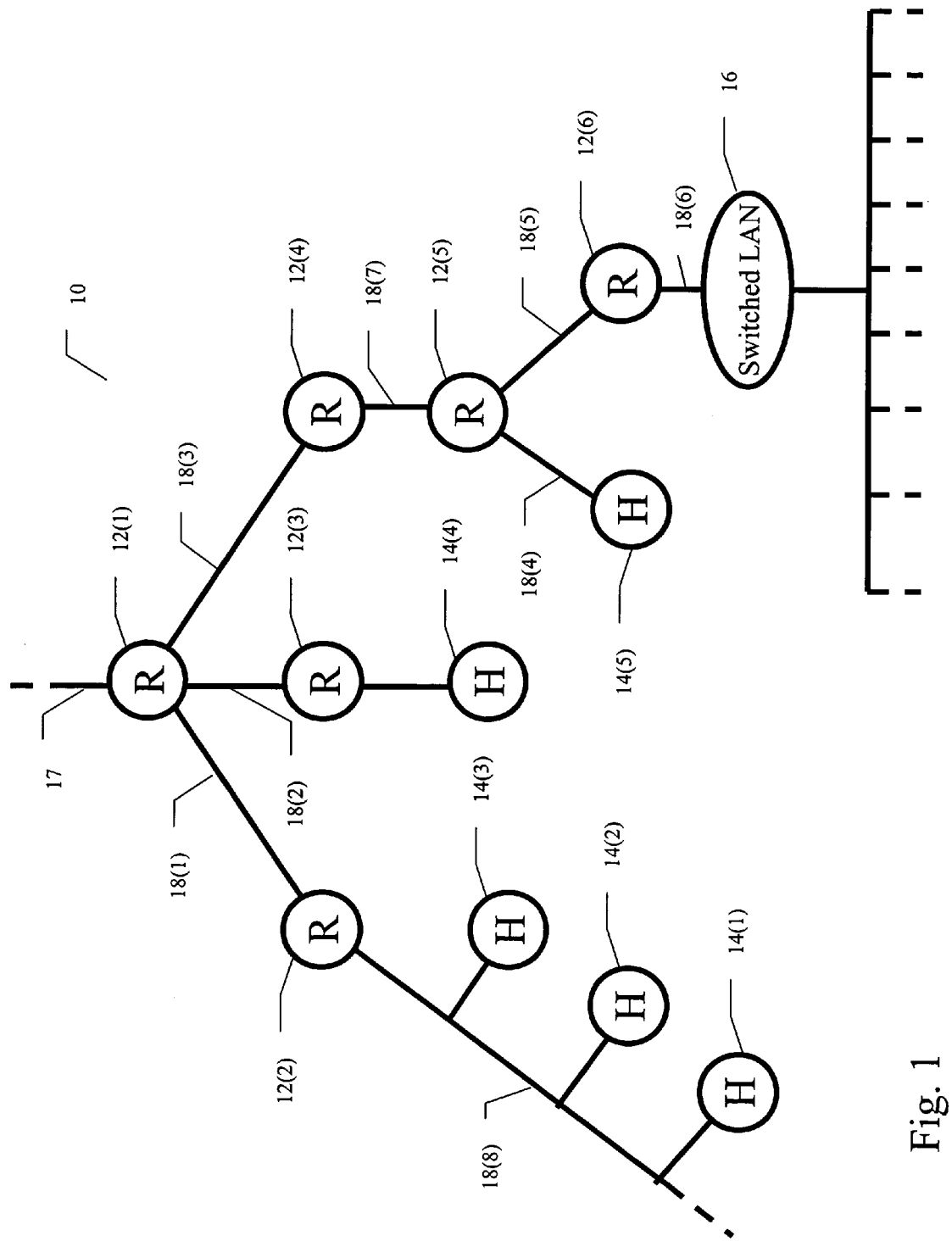
FIG. 1 is a block diagram of an example of a standard multicast-capable network.

The asymmetry between join and leave latency is explained herein with reference to FIG. 1, which is a network diagram of a typical network 10 used for multicasting. Data flows along the paths indicated between router 12 and other routers 12, between routers 12 and hosts 14, or between routers 12 and local area networks (LANs), such as LAN 16. In the description and figures, multiple instances of an object are identified by a common number associated with the object in general, while a specific instance of the object is identified by the common number followed by an instance number in parentheses.

In a typical multicast operation, packets addressed to a multicast group flow through network 10 and reach router 12(1) through path 17. When router 12(1) receives a multicast packet, it consults its internal tables to determine which interfaces 18, if any, contain members of the multicast group. FIG. 1 assumes that each node of network 10 is well differentiated into a host, a router or a switch (such as the node for LAN 16). Since switches in this diagram simply pass on received packets, the only active participants shown in FIG. 1 are hosts 14 and routers 12. In this example, hosts are distinguished from routers in that hosts are at the ends of paths and hosts decide whether or not to join or leave multicast groups. Thus, the hosts 14 in FIG. 1 are receptors for multicasting packets.

Last hop routers are the last routers along the path from the sender to hosts. For example, in FIG. 1, routers 12(2), 12(3) and 12(6) are last hop routers for all hosts that lie beyond them, whereas routers 12(1) and 12(4) are not last hop routers for any hosts that lie beyond them. Router 12(5) is a last hop router for host 14(5), but not a last hop router for hosts on the switched LAN 16. The IGMP protocol is used between hosts and last hop routers to allow hosts to join and leave multicast groups. Other protocols, such as PIM SM, are used internally within the network to dynamically grow and shrink the multicast distribution tree as needed depending on IGMP join and leave messages sent from the hosts to the last hop routers. When PIM SM is used in conjunction with general multicast protocols that include the use of Rendezvous Points (RPs), and use the Multicast Source Discovery Protocol (MSDP) and other related multicast protocols such as the Border Gateway Multicast Protocol (BGMP), internal join and leave latencies can be considerable and variable. However, when PIM SM is used in conjunction with Source Specific Multicast (SSM), which is much simpler and does not use RPs or MSDP or other related protocols such as BGMP, then internal join and leave latencies are not significant nor are they highly variable. IGMP join messages also do not usually contribute significantly to join and leave latency of hosts, but the IGMP leave protocol that can lead to significant leave latencies for hosts.

Management of the multicast tree with PIM SM when used in conjunction with SSM reacts very quickly to changes as needed, and thus the internal portion of the tree is not a large contributor to the overall join and leave latency of hosts. For example, when last hop router 12(6) receives the first IGMP join message for some group from some host beyond interface 18(6), it immediately sends a PIM SM join message to router 12(5). If router 12(5) is currently already receiving multicast packets addressed to the group, for example because host 14(5) is already joined to the group and receiving multicast packets from interface 18(4), then router 12(5) immediately starts copying received multicast packets to interface 18(5) as well as 18(4). If router 12(5) is not already joined to the group, then router 12(5) immediately sends a PIM SM join message to router 12(4), and router 12(4) sends a PIM SM join message to router 12(1). If router 12(1) is already receiving multicast packets addressed to the group, then router 12(1) immediately starts copying any subsequently received multicast packets addressed to the group to interface 18(3), router 12(4) receives these packets and copies them to interface 18(7), router 12(5) receives these packets and copies them to interface 18(5), and finally router 12(6) receives these packets and copies them to interface 18(6). The portion of the join latency due to the network internal PIM SM protocol, even for a join that takes several hops, are generally small, in the 10s to 100s of milliseconds, and almost always substantially less than one second in a terrestrial network.

Similarly, if router 12(6) determines that there are no more hosts beyond interface 18(6) that want to receive multicast packets addressed to a group, then router 12(6) immediately sends a PIM SM leave message to router 12(5). If router 12(5) is sending packets for this group only to interface 18(5) and not to 18(4), then router 12(5) immediately stops sending multicast packets for this group to interface 18(5) and router 12(5) also immediately sends a PIM SM leave message for the group to router 12(4), and so on. Thus, the portion of the leave latency due to the network internal PIM SM protocol, even for a leave that takes several hops, are generally small, in the 10s to 100s of milliseconds, and almost always substantially less than one second in a terrestrial network.

The IGMP join messages sent from hosts to last hop router also do not contribute substantially to overall join latencies of hosts. For example, if a first host sends an IGMP join message for a group to the last hop router, the last hop router immediately starts copying multicast packets for the group to the appropriate interface if the last hop router is already receiving the multicast packets, and otherwise the last hop router immediately issues a PIM SM join message to quickly start receiving multicast packets for the group from an upstream router. Thus, since both IGMP joins and PIM SM joins are processed quickly, overall host join latencies are reasonably small, typically in the 10s to 100s of milliseconds in a terrestrial network.

It is the IGMP leave protocol that can lead to long and undesirable host leave latency. The IGMP leave latency is generally small for last hop routers that have only a single host or small number of hosts beyond a given interface. In these cases, the router can keep track of the number of joined hosts beyond that interface and when the number of joined hosts to a particular multicast group drops to zero when the last host leaves the multicast group, the last hop router can immediately stop sending packets addressed to that multicast group to the interface. For example, in FIG. 1, router 12(3) has only one host 14(4) beyond its one interface. Thus, when host 14(4) sends a IGMP leave message for a particular group then the router can immediately stop sending packets for that multicast group to the interface.

The IGMP protocol can lead to long leave latencies when the last hop router has a larger number of hosts beyond a given interface. For example, in FIG. 1, last hop router 12(6) may have hundreds or even thousands of hosts beyond its interface to the switched LAN. In this case, the last hop router usually does not keep track of how many hosts beyond the interface are connected to each multicast group. Instead, when an IGMP leave message is received by the router, the router immediately initiates a polling protocol to determine if there are any other hosts still joined to the group that would like to continue to receive multicast packets sent to that group. Because the router must budget time for the polling message to propagate to the member host and receive a message back from the member host, there can be considerable latency between the time the last member leaves the group and when the router realizes that there are no members left. In that latency period, multicast traffic occupies the network, but is not needed by any hosts.

Until the polling process completes, the last hop router continues to send multicast packets for the group to the interface, and the large amount of time it takes for this polling process to complete is the source of the long leave latencies for the last host joined to a multicast group beyond an interface. One step of the polling process typically involves the last hop router sending out a multicast query message along the interface that will be received by all hosts still joined to the multicast address. If there is such a host, it responds by sending a message back to the last hop router indicating continued interest in receiving multicast packets sent to the group, and upon receipt of this message the last hop router discontinues the polling process and keeps sending multicast packets to the group. If the last hop router does not receive a reply to its query message, it could be either because the (1) the query message was lost; (2) a host still interested in receiving multicast packets addressed to the group sends back a reply and the reply is lost; (3) there are no hosts still interested in receiving the multicast packets addressed to the group. Because the last hop router does not know which of the three possibilities is true, it repeats the query process several more times (typically twice more) to gain confidence that if there is no response to any of the queries then it is likely that there are no hosts still interested in receiving the multicast packets addressed to the group, at which point the polling process is over and the last hop router stops sending multicast packets addressed to the group to the interface.

This overall polling process may take several seconds to complete, with the number typically ranging from three to nine seconds. The actual length of the polling process is implementation dependent. Because of the way the IGMP protocol works when hosts leave a group, overall host leave latencies can be quite significant, on the order of several seconds.

Another issue with respect to join and leave messages is that they can be lost in transit. If a join message is lost, the reception of packets may be delayed, particularly if the last hop access device is not serving other hosts. If a leave message is lost, the last hop access device may continue serving traffic even in the case when there are no hosts subscribed to the multicast group. The case of lost messages reveals a different type of intrinsic asymmetry between join and leave messages, in that a lost join message may delay packet traffic from being delivered while a lost leave message may delay the termination of packet traffic across the network.

Using the methods and apparatus described herein, the ill effects of host leave latency are greatly reduced by using multiple layers of multicast packets, each layer associated with a multicast group. To overcome the asymmetry between host join and leave latencies induced by current practice, networking protocols such as IGMP and PIM SM, the dynamic layering scheme introduces an asymmetrical end to end protocol used by the sender and the receivers to join and leave these layers, and to adjust the reception rate of the receivers by invoking an asymmetrical protocol. The dynamic layering scheme does not require any change in behavior by the networking elements or any changes in the IGMP or PIM SM or other networking protocols, as the only impact of the scheme is to the protocols used by the sender and the host receivers.

One feature of the dynamic layering scheme described below is that the send rate of a layer declines over time and hosts take these declines into account in maintaining or adjusting the host's receive rate. A host maintains its aggregate receive rate by joining new layers at a maintenance join rate, increases its aggregate receive rate by joining new layers more frequently than the maintenance join rate, decreases an aggregate receive rate by joining new layers more slowly than the maintenance join rate or not at all, and leaves a layer by sending a leave message, often when the send rate for a layer has greatly declined from its peak send rate.

One model of a network that is useful in the design of multicast congestion control schemes is a model that relates the responsiveness of a multicast congestion control scheme (which depends upon join and leave latencies) to the responsiveness of standard unicast congestion control mechanisms, foremost of which is TCP. In TCP, congestion control is triggered by a packet loss, and the response occurs within a round-trip time. In a conventional multicast environment, multicast congestion control triggered by a packet loss generates a response that cannot result in a traffic change until an IGMP leave request has been processed. As we have discussed, this can take orders of magnitude longer than a TCP round-trip time.

The above model reflects the fact that IGMP leave latencies can be an order of magnitude slower than IGMP join latencies and uses a layer congestion control scheme that takes into account this model to, among other benefits, reduce the impact of slow leave latencies and the large variance in leave latencies. Using dynamic layer congestion control (DLCC) as described herein, the server (or other source of traffic) varies the send rates on different layers over time. More particularly, the server can reduce the send rate on layers over time in order to reduce a reception rate without an explicit leave request. Receivers decrease their reception rate quickly by not joining any additional layers. In order for receivers to keep their reception rate the same, they occasionally join layers at a moderate pace, and in order to increase their reception rate they occasionally join layers at a more aggressive pace. Receivers leave layers with lowered (often zero) send rates, so that those layers can be reused at some later future time. The sender does not assume that leaves occur immediately, but the layers are organized in such a way that a leave from a layer will take effect before the layer is reused.

The re-use of layers is preferred if each layer necessarily requires a distinct multicast address and the number of such addresses is limited. Leave operations will still be required, in order to enable timely re-use of these addresses. Several of the schemes described or suggested herein get around the disadvantage normally associated with leave operations, i.e., that they are slow to cause an effect, by changing the purpose of a leave request. Instead of a leave request being required to effect a rate decrease, in the dynamic layering scheme, leave requests are not required to effect rate decreases. Instead, rate decreases at a receiver occur by the passive activity of the receiver not joining further layers. In most variations of the dynamic layering scheme described herein, leave operations allow for the re-use of layers.

Herein, the worst case join latency, or JL, is defined as the worst case time between when a receiver issues an IGMP join message and when the receiver receives the first packet from the joined group. In many cases JL may be difficult to predict accurately, while an upper bound on JL may be known. The upper bound will suffice in the following discussion. Similarly, the worst case leave latency, or LL, is defined to be the worst case difference between the time when a receiver issues an IGMP leave message and the time when the receiver stops receiving packets from the corresponding group. Again, LL may be difficult to predict accurately but a suitable upper bound may be known, in which case the upper bound may be considered in the following discussion.

Join latencies are typically on the order of round trip times, and hence the value JL is comparable to the round trip time of TCP. Leave latencies are typically much longer and much more variable, and hence the value LL can be orders of magnitude longer than JL or the round trip time of TCP. As TCP responds to congestion at speeds on the order of the round trip time, in order for multicast traffic to have similar responsiveness the arrival rate should be able to decrease at a speed on the order of JL. All conventional schemes respond on the order of LL, however, and thus risk unfair behavior against TCP streams or other like traffic.

Figure 2:
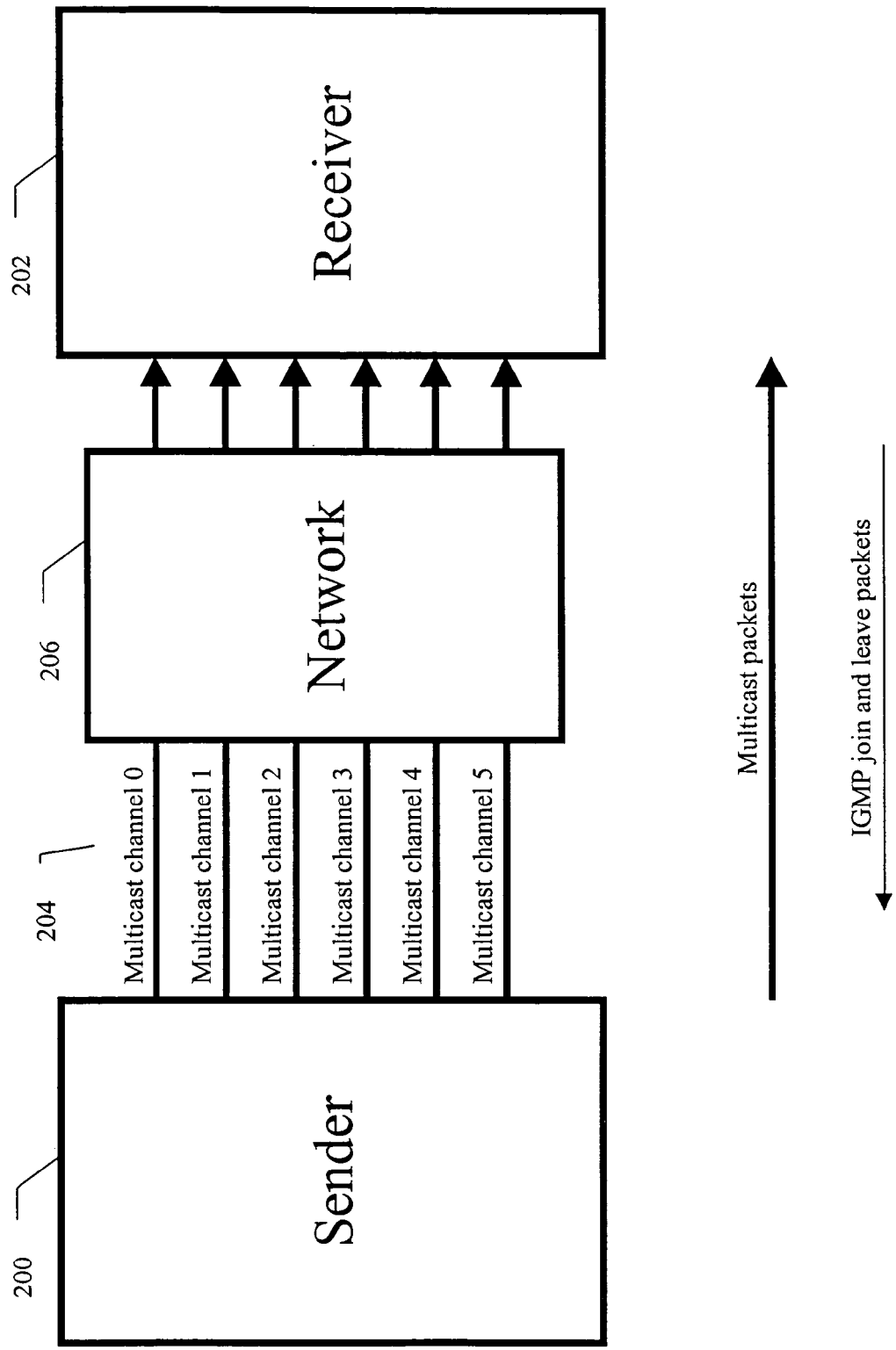
FIG. 2 is a simplified block diagram of a sender, a receiver and a channel from the sender to the receiver.

A server using dynamic layers as part of a multicast session transmits packets using a plurality of layers to carry the traffic of a multicast group. The process of multicasting using dynamic layers is described below, with references to FIG. 2, which shows a simplified representation of a multicast sender 200, such as a server, and a multicast receiver 202. FIG. 2 is a simplified representation because, among other things, it shows only one receiver and one sender. As illustrated by FIG. 2, sender 200 sends packets through one or more multicast channels 204, which are carried over a network 206 to receiver 202, and receiver 202 sends join and leave messages to the network 206 to join and leave these channels, or groups, or multicast addresses. Of course, in most multicasting arrangements, routers and various paths are interposed between the sender and the receiver as part of the network, but those are not shown in the simplified figure. It should be understood that each of the multicast channels is associated with a particular multicast address, but the packets for multicasting can be carried in a single physical connection or multiple connections.

The functionality provided by static layering schemes can also be provided by dynamic layering schemes as detailed below. A static scheme can be completely defined by the number of layers and the send rate of the layers. For example, a static scheme may have n layers and send rates $R(0)$, $R(2), \ldots, R(n-1)$ associated with these layers. Three dynamic layering schemes are described below that are demonstrated to be useful for providing the same receiving rate capabilities as a static scheme with layers $R(0), \ldots, R(n-1)$. The demonstration below is a replacement approach, in that it shows a static layering scheme being replaced by a dynamic layering scheme with the same reception rate possibilities. The first dynamic scheme, called a one layer DLCC scheme below, is suitable for replacing any static layering scheme with a DLCC scheme by replacing each static layer individually. The second dynamic scheme, called a multiple layer cumulative DLCC scheme below, is typically suitable only for replacing static layering schemes in the restricted class of cumulative layering schemes in a manner that is more efficient overall than replacing each static layer individually. The third dynamic scheme, called a hybrid DLCC scheme below, is a mix of the first two schemes and can be applied to a class of static schemes that is more general than cumulative layering schemes but more restricted than the class of all relaxed layering schemes. In all cases, the replacement offers significant advantages as previously described by allowing passive decreases in the sending rate.

A One Layer DLCC Scheme

Figure 3:
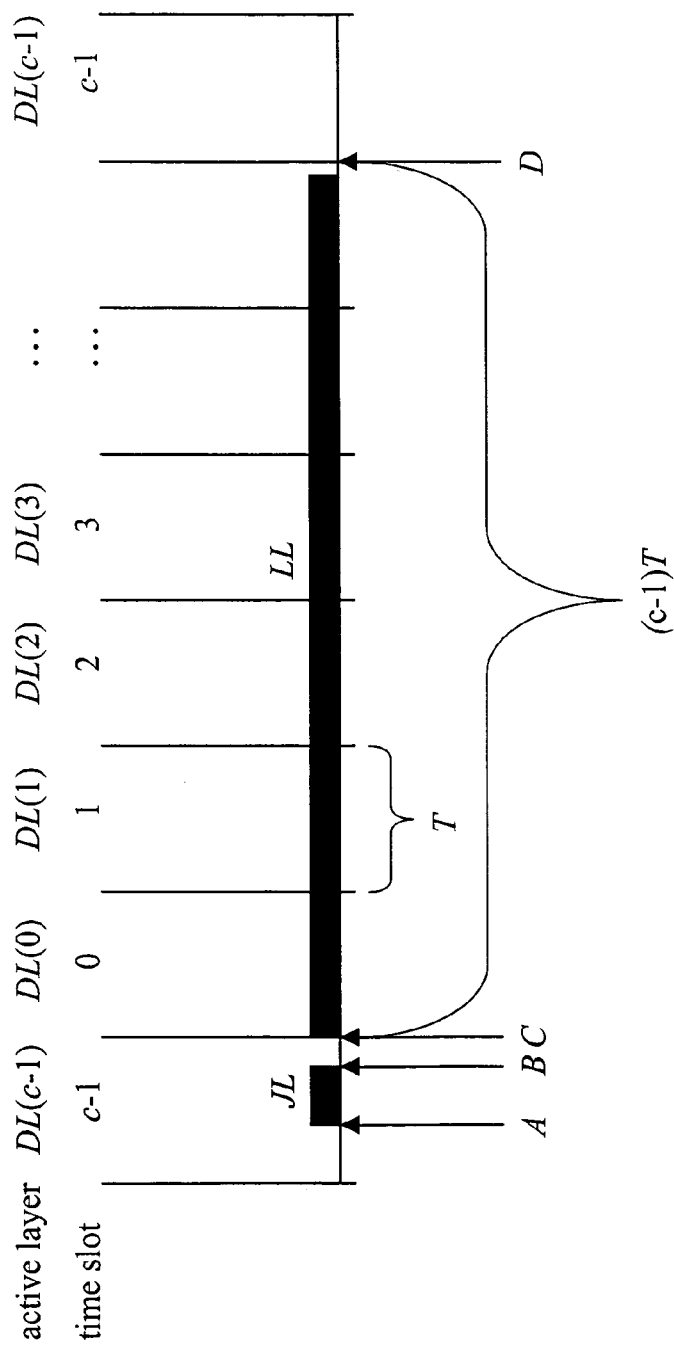
FIG. 3 is a timing chart illustrating a process of joining and leaving a multicast group and the relationship of several parameters of the dynamic layer process of one aspect of the invention.

In the first approach, each static layer is separately replaced under the dynamic layer scheme using multiple dynamic layers. Replacing the entire static layering scheme is therefore accomplished by appropriately replacing each static layer. The number of dynamic layers necessary to replace each static layer depends on the parameters JL and LL as described below. FIG. 3 is a timing chart illustrating a process receiver 202 and sender 200 might perform to join and leave a multicast group and the relationship of several parameters of a dynamic layer scheme where one static layer is replaced with a plurality of dynamic layers.

Figure 4:
FIG. 4 is a timing chart illustrating how c dynamic layers can be used to emulate one static layer.
Figure 6:
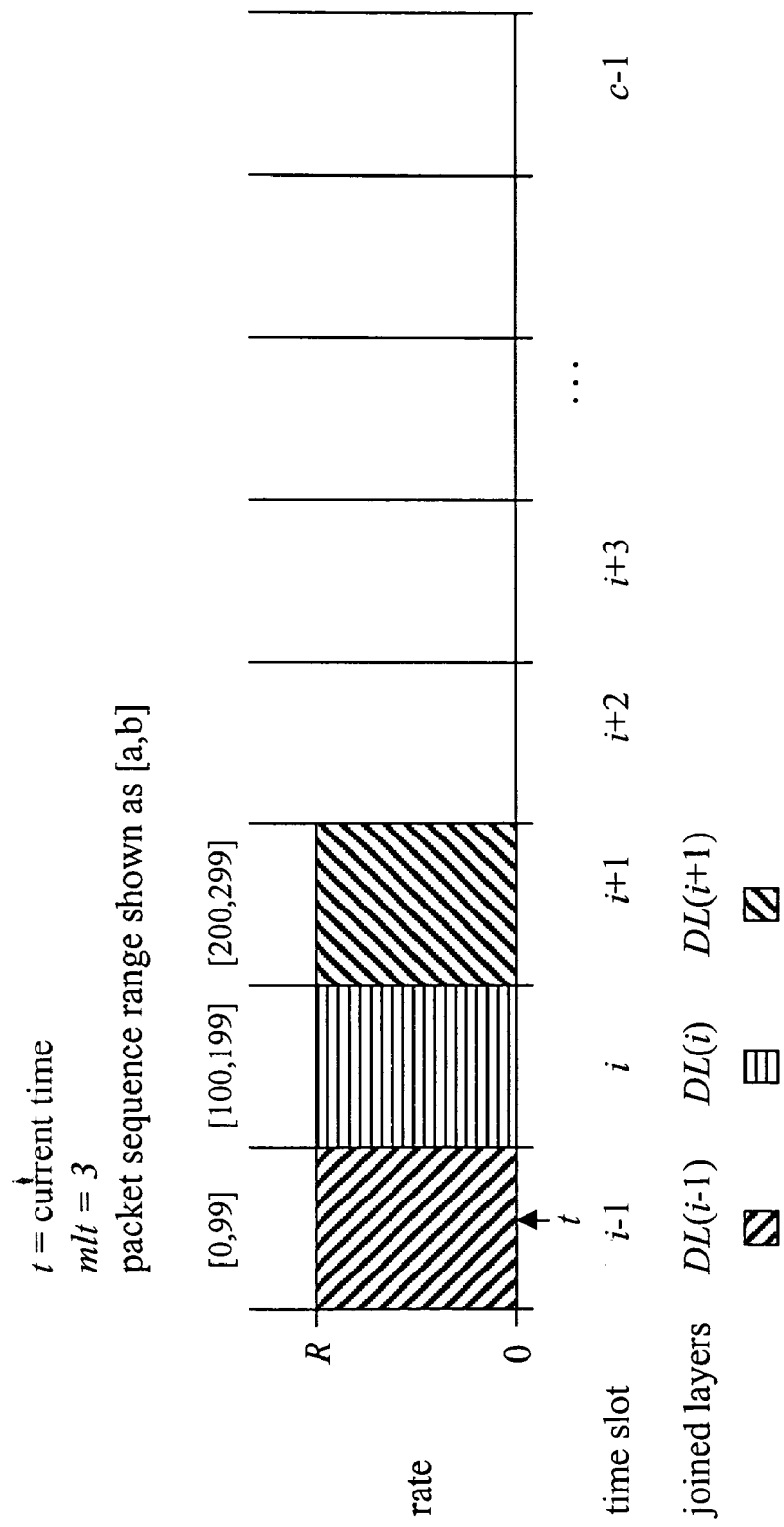
FIG. 6 is a timing chart illustrating three dynamic layers emulating a static layer over three time windows, where the sending rate for the static layer is 100 packets per time window.

First, the replacement of one static layer with a dynamic layer scheme will be described. Suppose that the static layer has an associated send rate R and assume that LL is much larger than JL. Let T be a number of seconds that is on the order of JL. Suppose that $JL<T<LL<(c-1)\cdot T$, where c is a positive integer, as shown in FIG. 6. To replace this static layer with dynamic layers, the network logically divides the static layer into c dynamic layers $DL(0), DL(c-1)$. The transmissions from the sender for that static layer are time-division multiplexed as shown in FIG. 4, with a slot of T seconds associated with each dynamic layer. In other words, one slot is for $DL(0)$, the next slot is for $DL(1)$ and so on. In general, the slots are numbered sequentially, modulo c, by an index i.

The sender sends packets continuously at rate R, and the packets are sent in time slot i to dynamic layer $DL(i)$. Each dynamic layer has its own multicast IP address, so the sender sends packets to a dynamic layer by outputting packets addressed to the IP address of the dynamic layer. Thus, the sender rotates to the IP address for the next layer (modulo c) each T seconds. During a time slot i, only dynamic layer $DL(i)$ carries packets. The packets sent by the sender are consecutively numbered, and the numbering is consecutive as the sender switches from one dynamic layer to another at the end of a time slot.

Figure 5:
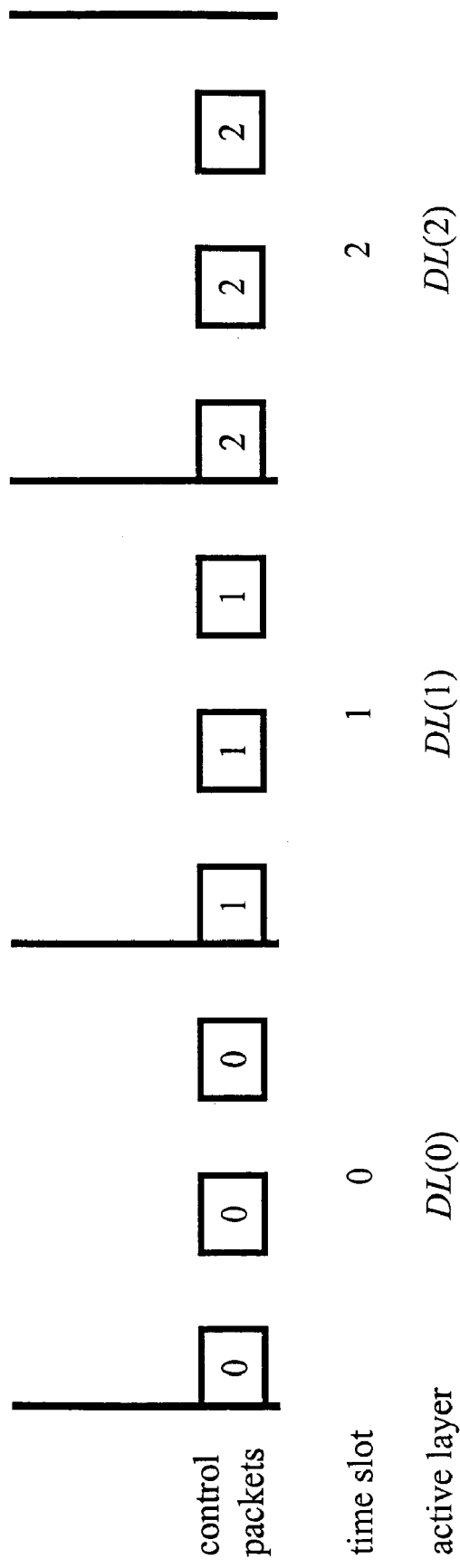
FIG. 5 is a timing chart showing the time window indices carried in control packets or within the control information portion of data packets that indicate to the receiver the current time window index.

The above scheme typically requires some synchronization, in that the receiver must know the appropriate current time slot in order to join effectively. There are multiple ways of handling this synchronization. In one embodiment, the sender also sends a stream of control packets at a slow rate in a separate multicast group, as shown in FIG. 5. These packets contain the time slot index, and are used for synchronization on the receiver side. The time slot index changes every T seconds, as described above. Thus, if a receiver does not know the current value of the time slot index i, the receiver joins the control multicast group and extracts the time slot index from a control packet.

In the preferred embodiment, each receiver in the multicast group is designed to first join a base layer, which is a layer with a constant, static rate that is generally smaller than other layers. The packet format of the packets in the base layer are typically the same as the packet format for all other layers, and thus the base layer also contains data. In this embodiment, joining the base layer is required before joining other layers. Because the base layer maintains a static send rate, no time slot information is necessary in order to join the base layer. Time slot or other control information is then embedded in all packets, including packets in the base layer and all other layers. Thus, a receiver can detect the beginning of a new time slot from the first packet received from any layer associated with that time slot, allowing the receiver to detect the beginning of new time slots as soon as possible.

Typically, the receiver is already joined to the base layer multicast group and remains joined to the base layer in order to receive information such as time slot information. In the preferred embodiment, receivers issue joins or leaves near the start of time slots, and typically leave messages are not issued for a layer until the send rate for the layer has dropped to zero.

In the simplest embodiment of the first approach, a receiver that is receiving packets on a layer DL(i) can send a join message in order to join the next layer DL(i+1) before the transition time where the sender stops sending packets on layer DL(i) and begins sending packets on layer DL(i+1). By joining the next layer, the receiver maintains a reception rate of R. If the receiver fails to join layer DL(i+1) then when time slot i+1 begins, the receiver will no longer receive the packets associated with this set of dynamic layers, as the sender will stop sending out packets on layer DL(i). Therefore, the receiver can simulate a leave by the passive action of not joining the next layer. Of course, the receiver should also leave layer DL(i) at the appropriate transition time, since the layer will be re-used after c time slots. Because this scheme uses a sufficient number of dynamic layers so that cT>LL, the receiver will leave before further packets are again transmitted along the dynamic layer DL(i).

In many cases, the receiver may know that it wants to continue receiving packets when subscribed to DL(i) for several subsequent time slots. That is, the receiver will know in advance that it wants to receive packets for layer DL(i+1), DL(i+2), etc. For example, in replacing a cumulative static layered scheme in this approach, the receiver may want to emulate retaining a static subscription to the i-th layer of rate R(i) for several time slots. This foreknowledge could arise because in a cumulative scheme, a receiver leaves only the top layer in the face of loss. Therefore, if there are many layers, it could be known that some bottom layers will remain subscribed to for several time slots.

If the receiver has that foreknowledge, the scheme may be optimized in the following way. A receiver keeps track of a variable MLT that represents the minimal number of time slots before the receiver would possibly want to leave the corresponding static layer for a set of dynamic layers. By default, if the receiver is not joined to the layer, then MLT=0. For the schemes described below, MLT increases by one, stays the same, or decreases by one to represent different certainties a receiver has about how long the receiver will remain joined. For example, when MLT increases from zero to one, this means that the receiver joins the layer and will remain joined for at least one time slot.

The only dynamic layer that the receiver would potentially want to leave at the beginning of time slot i is DL(i−1). The receiver leaves DL(i−1) at the beginning of time slot i if it is joined to DL(i−1) during time slot i−1 and if the adjusted value of MLT at the beginning of time slot i is strictly less than c. If the value of MLT at the beginning of time slot i is at least c, then the receiver should not leave, since it is known in advance that the receiver will want to remain subscribed the next time the layer carries packets (i.e., the layer is re-used).

Suppose the receiver is not joined to the static layer during time slot i−1 and wants to join the static layer at the beginning of time slot i (and this adjusts MLT from zero to one). In this case, the receiver joins DL(i). If the value of MLT is at least c during time slot i−1, then the receiver is joined to all c dynamic layers during time slot i−1. In this case, the receiver does not attempt to join any dynamic groups at the beginning of time slot i, nor does it attempt to leave any dynamic groups at the beginning of time slot i. Suppose the receiver is joined to the static layer during time slot i−1 for the case where MLT is strictly less than c during time slot i−1. In this case, the receiver behavior at the beginning of time slot i depends on whether the receiver wants to change MLT. If the receiver wants to decrease MLT by one, then the receiver performs no joins. If the receiver wants to keep MLT the same, then the receiver joins the group DL(i+MLT-1). If the receiver wants to increase MLT by one, then the receiver joins DL(i+MLT-1) and DL(i+MLT). In all three cases, the receiver leaves group DL(i−1) (which may take effect several seconds later, but during that time there are no packets sent to DL(i−1)). Note that the effect here is not to increase the rate; joining this dynamic layer in advance simply implements the knowledge that the receiver will remain subscribed to this layer over this number of time slots.

FIG. 6 shows an example where the receiver is joined to three dynamic layers, DL(i−1), DL(i) and DL(i+1) during time slot i−1. The figure indicates the projected reception rate for the receiver based on the current set of joined dynamic layers. In this case, MLT=3, i.e., the receiver will be joined to this set of dynamic layers for a total of at least three time slots, including the current time slot i−1.

Figure 7:
FIG. 7 is a timing chart showing the actions of a receiver with respect to the dynamic layers.

FIG. 7 is a timing chart showing the actions of a receiver with respect to the dynamic layers in order to ensure that the current static rate is maintained for an additional two time windows, thereby increasing the amount of time before the static layer is left by one time window from what it was at the beginning of the preceding time window. FIG. 7 shows what happens if the receiver decides to increase MLT to 4 at the beginning of time slot i by joining DL(i+2) and DL(i+3) and leaving DL(i−1). Then, at the beginning of time slot i, the receiver will receive packets for a minimum of at least 4 time windows. Furthermore, the leave of DL(i−1) will have taken effect by the time DL(i−1) carries packets again.

Figure 8:
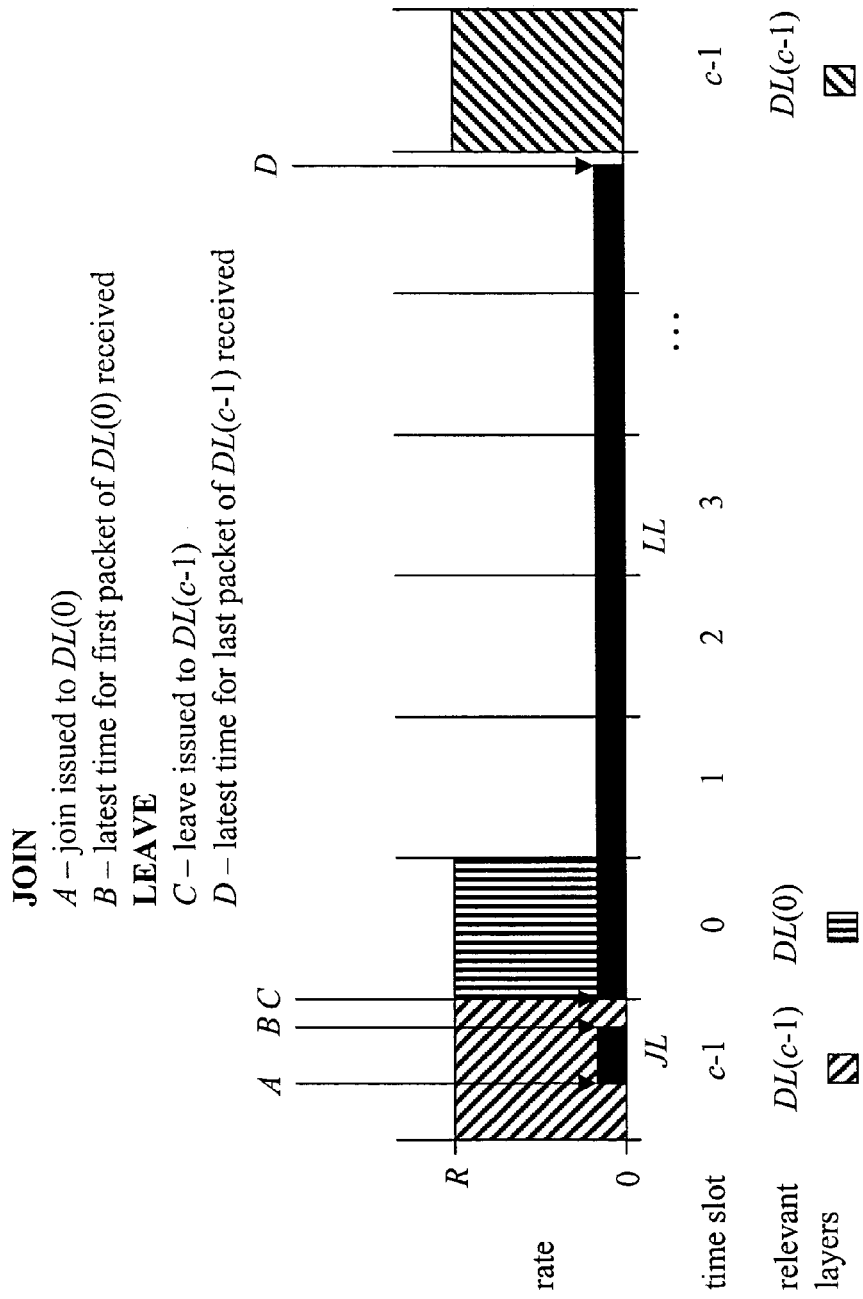
FIG. 8 is a timing chart showing the join and leave latency timings and how they relate to dynamic layers emulating a static layer.

To ensure that the reception rate of the receiver is smooth, a join can be scheduled far enough in advance of the beginning of the time slot to ensure packets carried over the joined dynamic layer are received. Similarly, a leave message can be scheduled far enough after the beginning of the time slot to ensure all packets carried over the left dynamic group are received, as shown in FIG. 8.

For multiple static layers, the receiver replaces all the static layers as above. This allows the receiver to change its rate by aggregating reception over multiple dynamic layers. Of course this may require computing multiple MLT values.

The dynamic scheme described above solves the problem of large leave latencies by allowing a reduction in the reception rate without an explicit leave message. By not taking the action of joining further dynamic layers, the receiver can passively effectively leave a dynamic layer. Thus, instead of reaction time being constrained by large and variable leave latencies, reactions can occur at the much faster and completely predictable rate T determined by the latency of a join.

Using the replacement method, the total number of dynamic layers used by the sender is c times the number of static layers. Thus, if n multicast addresses are used for the static layering scheme, then c·n multicast addresses are needed for the dynamic scheme. However, at most n of the dynamic layers carries packets at any particular time.

If the static layer scheme requires at most x leaves and joins in a given period, then the corresponding dynamic layer scheme will require at most x+n leaves and joins at the beginning of a time slot for that same activity. However, if the static layer scheme has the property that most of the time the value of MLT for most of the static layers is above c, then the number of joins and leaves would be much lower, as most of the time the receiver is joined to all c dynamic layers associated with a static layer and during that time, no leaves and joins are required. Whether or not a static layer scheme has this property depends on the scheme and on the value of c (the smaller the value of c the more likely that MLT will be larger than c). For some relaxed static schemes, such as those described in the background to the present disclosure, the value of MLT can quickly exceed the value of c.

A Multiple Layer Cumulative DLCC Scheme

The translation described above requires a large number of dynamic layers and a large number of concurrent joins and leaves if the value of c is large. A translation that requires fewer dynamic layers and fewer concurrent joins and leaves will now be described as applied to cumulative static layer schemes.

Suppose there are n static layers with rates $R(0), \ldots, R(n-1)$ in the static layer scheme, where zero is the index of the lowest layer, n−1 is the index of the highest layer, and a receiver joins and leaves the layers in strict order from lowest to highest index, i.e., the static scheme is a cumulative scheme. In the first approach, the dynamic layer scheme uses n+c+1 dynamic layers to simulate this. There are n+c time slots of length T seconds each and all packets contain the value of the current time slot index. In order to describe this first approach, define $R(n)=R(n+1)=R(n+c-1)=0$. Let $DL(0), \ldots, DL(n+c-1)$ be the first n+c dynamic layers. Then, the transmission packet rate on DL(j) is at rate R(n+j-i) during time slot i, where n+j-i is computed mod n+c. This implies that DL(j) is carrying the packets for static layer n+j-i mod n+c during time slot i. There is an additional base layer in the dynamic scheme with a constant static transmission packet rate that is negligible, i.e., at most that of the lowest layer of the static scheme. All receivers join to and stay joined to the base layer for the duration of their reception. Each packet in the base layer also contains the current time slot index. The packets in the base layer may be the same format as the packets in all the other layers, but they may not carry any data and instead just contain control information such as the current time slot index.

Figure 9:
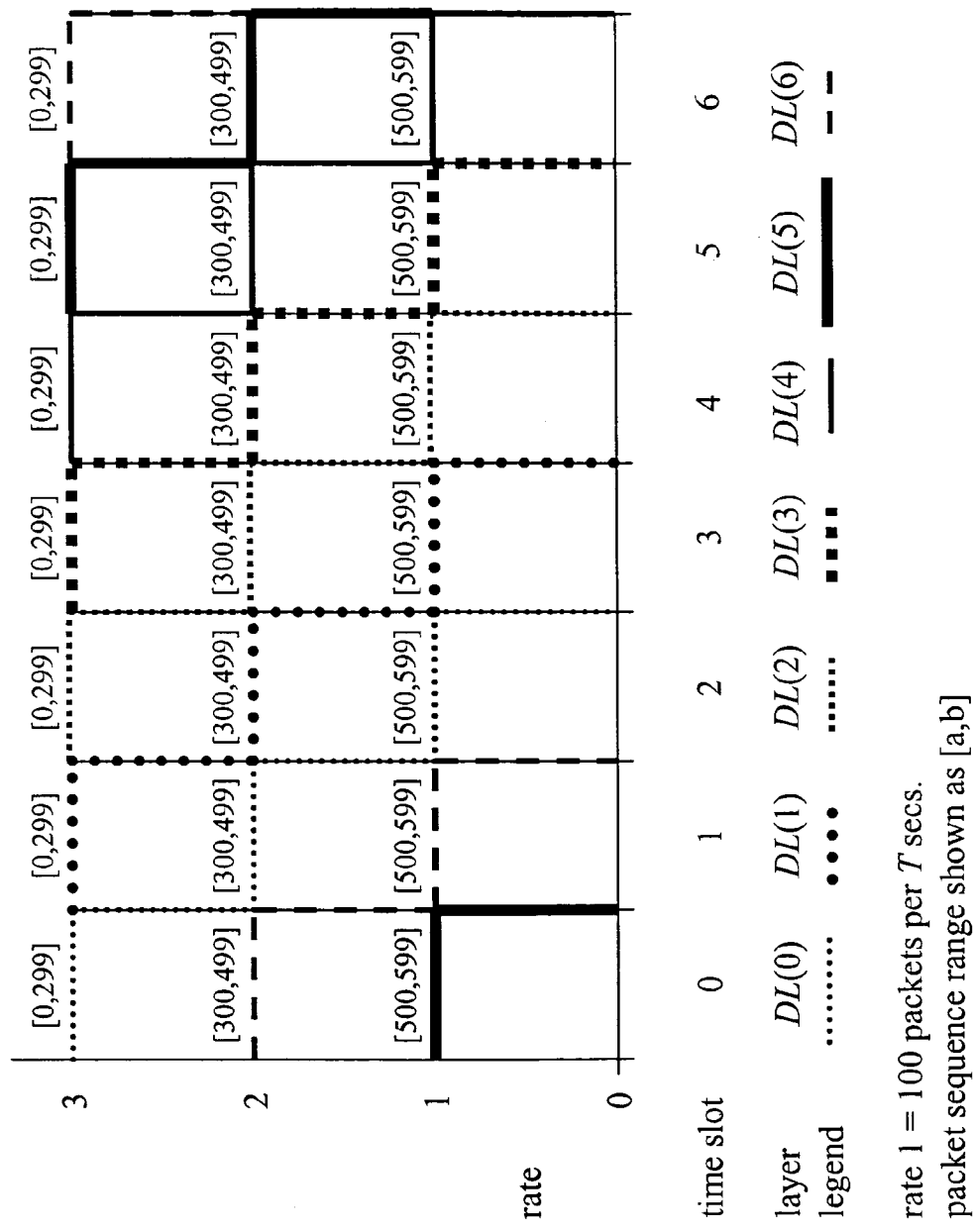
FIG. 9 is a timing chart illustrating a progression of send rates for seven dynamic layers emulating three static layers.

The packet sequence numbers are consecutive within a dynamic layer. Thus, since a receiver remains joined to a dynamic layer until it drops to zero, the receiver can typically measure packet loss over several time windows if the receiver first joins the dynamic layer when it is carrying the flow of a high indexed static layer. FIG. 9 is a timing chart illustrating a progression of send rates for several layers that shows an example with n=3 and c=4, where $R(0)=1$, $R(1)=2$, and $R(2)=3$. Receiver congestion control is handled by the following protocol. Let DL(x), DL(x+1), DL(x+2), . . . , DL(y−1), DL(y) be the consecutive set of dynamic groups that a receiver is joined to during some time slot. The rate of DL(x) is R(0) in the current time slot and DL(x) will carry no further packets for c time slots starting at the beginning of the next time slot. In general, the rate of DL(x+z) is R(z) in the current time slot and it will be R(z-1) starting at the beginning of the next time slot.

The action of the receiver at the beginning of the next time slot is as follows. Independent of all other actions, the receiver leaves DL(x). If the receiver wants to decrease its rate, then the receiver takes no further action. If the receiver wants to keep the same rate then the receiver joins DL(y+1). If the receiver wants to increase its rate then the receiver joins DL(y+1) and DL(y+2). All the indices are to be interpreted mod n+c.

Figure 10:
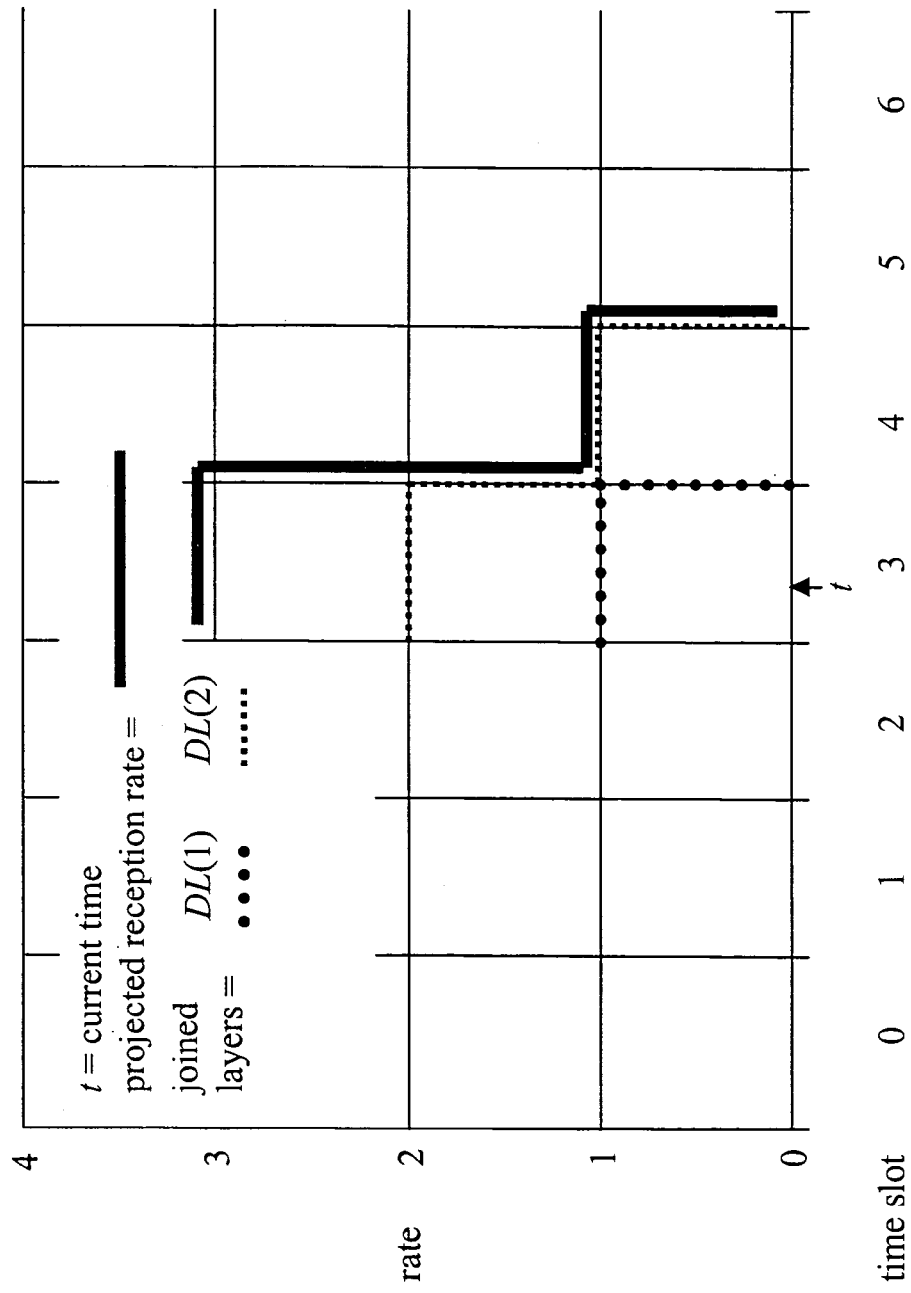
FIG. 10 is another timing chart illustrating send rates for several two dynamic layers emulating several static layers, and the aggregate reception rate of a receiver joined to the dynamic layers.
Figure 11:
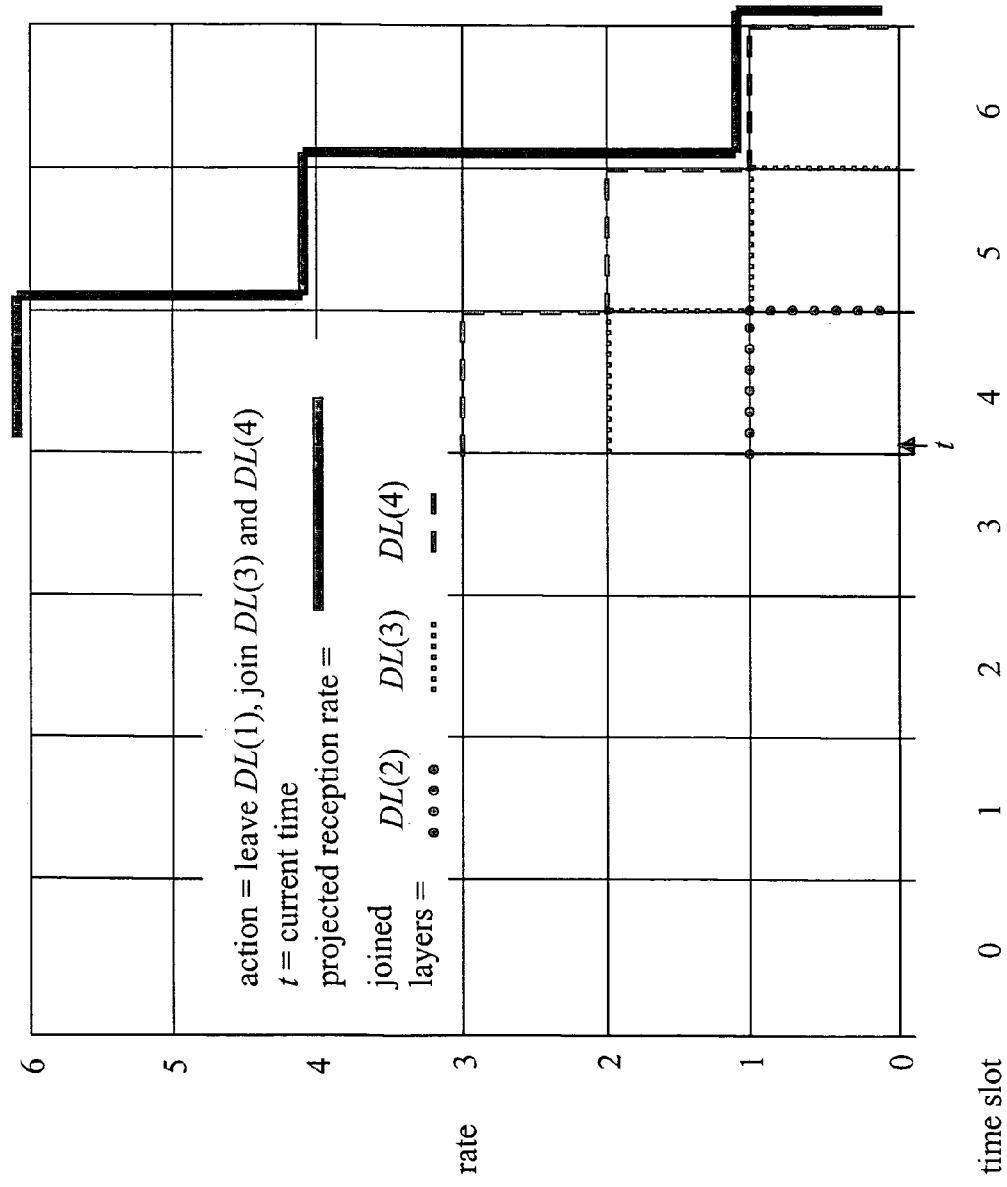
FIG. 11 is a timing chart illustrating how a receiver can increase reception rate by passively leaving one dynamic layer and by joining two additional dynamic layers.

FIG. 10 shows an example corresponding to FIG. 9 where the receiver is currently joined to the bottom two layers during time slot 3, i.e., it is joined to DL(1) with current rate 1 and it is joined to DL(2) with current rate 2. FIG. 11 shows that the receiver can increase its rate by leaving DL(1) (passively) and joining DL(3) and DL(4) at the beginning of time slot 4.

Figure 12:
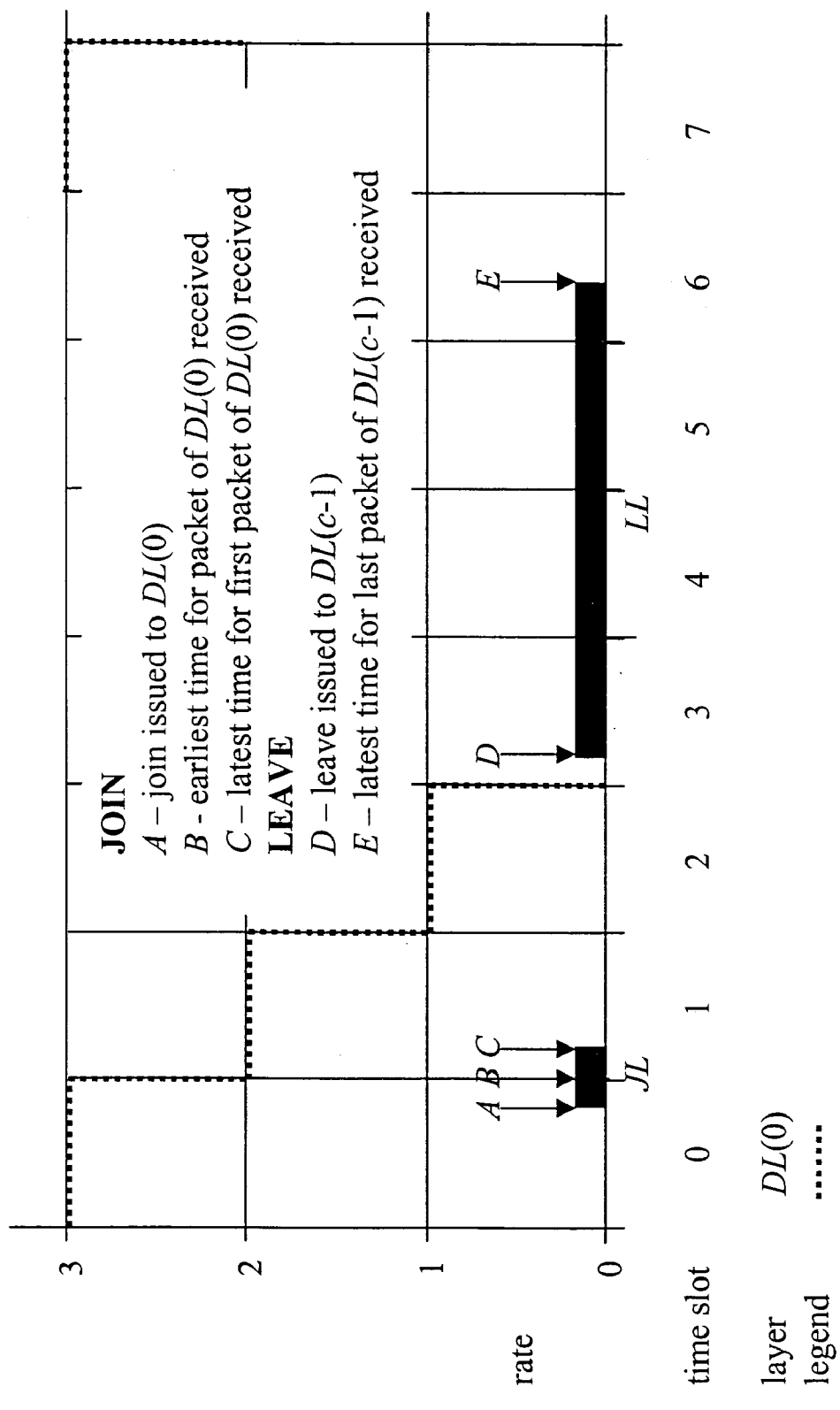
FIG. 12 is a timing chart illustrating send rates for several dynamic layers and the join and leave latencies for a receiver wishing to adjust its reception rate.

To ensure that the reception rate of the receiver is smooth, a join can be scheduled just far enough in advance of the beginning of the time slot to ensure that packets start arriving from the joined dynamic layer just after the beginning of the next time slot. However, care must be taken that the join is not early enough to cause reception of packets from the joined dynamic group before the beginning of the time slot, as this may cause unnecessary congestion. Similarly, a leave can be scheduled far enough after the beginning of the time slot to ensure all packets carried over the left dynamic group are received, as illustrated in FIG. 12.

The dynamic scheme described above typically causes a reduction in latencies. One reason is that the dynamic scheme simulates immediate leaves for the static layer scheme at the beginning of each time slot. Furthermore, the less volatile join latency can be continually measured and joins to dynamic groups can be timed so as to minimize the join latency, and thus the dynamic scheme simulates almost immediate joins for the static layer scheme at the beginning of each time slot. Thus, instead of reaction time being constrained by large and variable leave latencies, reactions can occur at the much faster and completely predictable rate T.

The number of dynamic layers used by the scheme is n+c+1, where n is the number of static layers and (c+1)·T is greater than the maximum leave latency. Thus, if n multicast addresses are used for the static layering scheme, then n+c+1 multicast addresses are needed for the dynamic scheme. This is better than the c·n multicast addresses required for the simulation of a relaxed layer scheme. At most n+1 of the dynamic layers carries packets at any one time.

A variant of the scheme described in the first approach above sets the transmission packet rate of the base layer to R(0). As before, all receivers join to and stay joined to the base layer for the duration of their reception, and each packet in the base layer also contains the current time slot index. In this variant, packets in the base layer carry data and control information in the same format as in all other layers. Then, instead of using n+c additional dynamic layers, only n+c−1 additional layers beyond the base layer are used. There are n+c−1 time slots of length T seconds each and all packets contain the value of the current time slot index. In order to describe the scheme, define $A(0)=A(n)=A(n+1)=A(n+c-2)=0$, and for all $i=1, \ldots, n-1, A(i)=R(i)$. Let $DL(0), \ldots, DL(n+c-2)$ be the additional n+c−1 dynamic layers. Then, the transmission packet rate on DL(j) is at rate A(n+j-i) during time slot i, where n+j-i is computed mod n+c−1. This implies that DL(j) is carrying the packets for static layer n+j-i mod n+c−1 during time slot i, except when n+j-i mod n+c−1=0 in which case the packet transmission rate of DL(j) is zero. The basic idea behind this variant is that the base layer simulates being joined to the lowest layer in the static scheme, and the receiver dynamically adjusts its rate up and down using the remaining dynamic layers.

A receiver in a static cumulative layer scheme requires only one leave or one join at any point to change its rate. A receiver requires one leave and at most two joins to change its rate using the corresponding dynamic scheme.

A Hybrid DLCC Scheme

In one hybrid DLCC scheme, the cumulative layer scheme is combined with DLCC for the relaxed layer scheme, by bundling more than one static layer together and simulate those bundled layers using the DLCC cumulative layer scheme, and then treat each of these bundles as independent units and use the DLCC relaxed layer scheme on them. For example, if there are nine static layers, then these might be bundled into three sets of three layers each. Each set of three would be simulated using the DLCC cumulative layer scheme. Then, the DLCC relaxed layer scheme can be used to combine these three sets into an overall hybrid scheme. In this example, if c=4, then the total number of dynamic layers used is 3·(3+4)=21.

Preferably, leaves occur within c time windows, as if this does not happen then suddenly the receiver (and the network) will be flooded with unwanted packet flow. There are several ways to ensure that it does not happen. One way is to use conservative values for c. Another way is for receivers to issue more than one leave request for a given leave. Yet another way is to require that the sender always send packets on all dynamic layers, even those that have an effective send rate of zero, so that receivers can observe when their leave requests become effective.

Once a receiver has issued a leave to a dynamic layer it still pays to receive packets on the layer. This is useful because the network has already carried the packets to the receiver in any case, and it would be wasteful to discard these additional packets if they are useful to the receiver. For example, on a shared LAN, receivers may not be able to affect the leave of the last hop access device from the dynamic layer because other receivers may still be joined to the layer. In this case, the receiver may benefit greatly because other receivers may be still joined to the layer. These extraneous receptions can be used to quicken the download of the source object, but they should not be used to determine the congestion control strategy. Note that these additional packets may be received by the receiver even if an IGMP leave message has been sent by the receiver.

In other variations, control information might include more than just time slot information, such as the number of milliseconds until the start of the next time slot from the sender's point of view.

Figure 13:
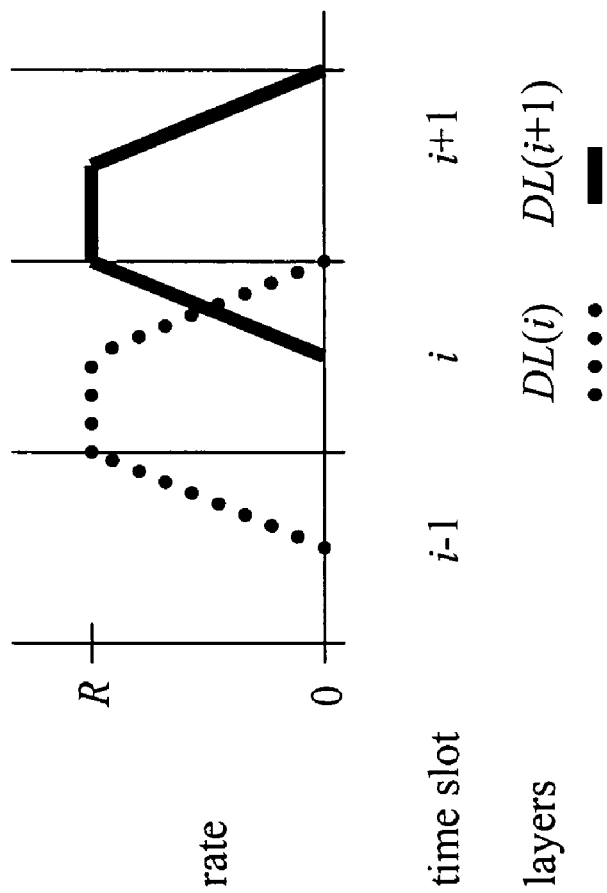
FIG. 13 is a timing chart illustrating send rates that do not change instantaneously for a dynamic scheme emulating a static layer.
Figure 14:
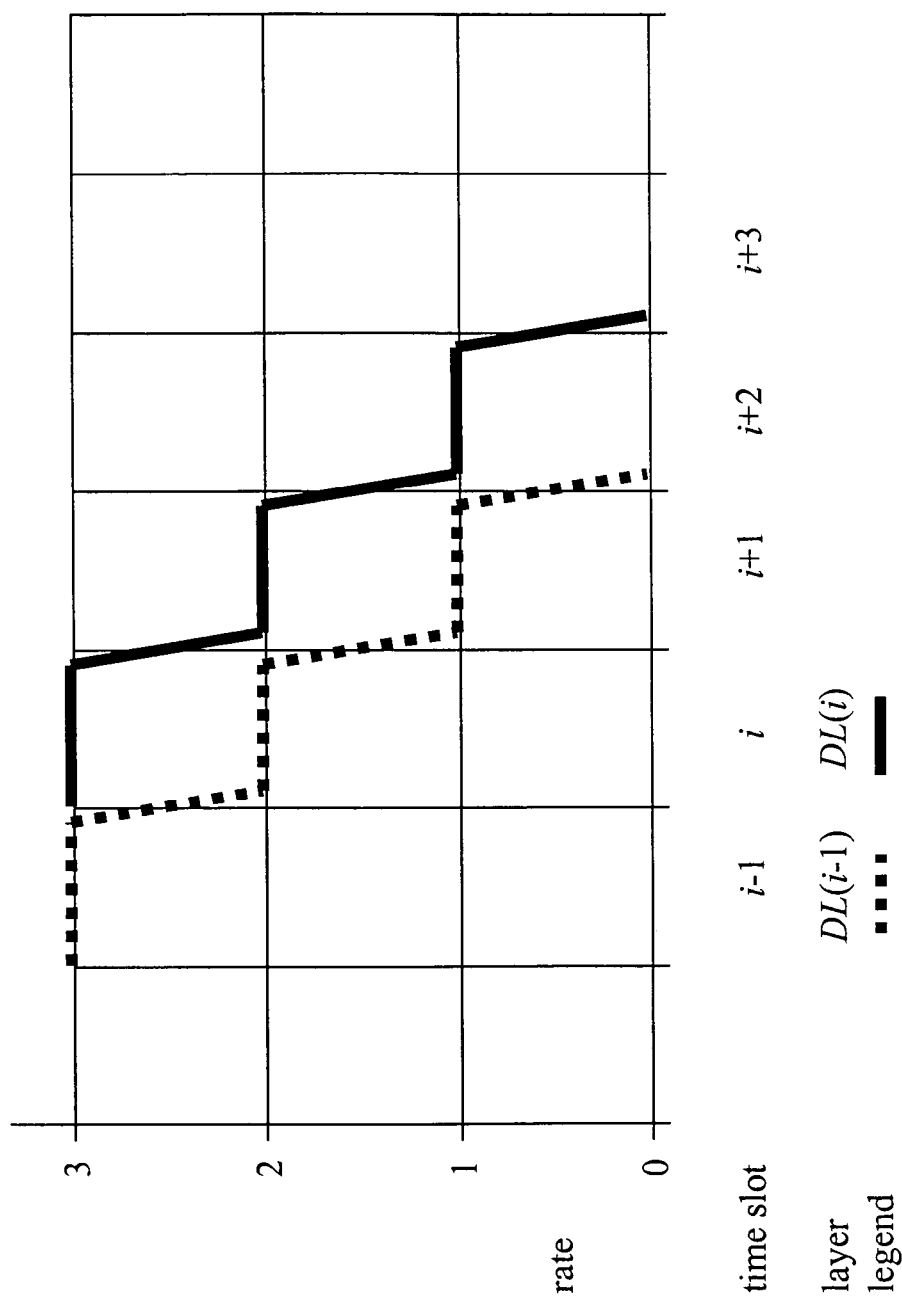
FIG. 14 is a timing chart illustrating the effect on send rates using a dynamic scheme emulating several static layers with the more gradual changes in rates similar to those shown in FIG. 13.

The changes to the rate of the dynamic layers described above are all step functions. However, in some implementations smoother steps might be used for better handling. Examples are shown in FIG. 13 for the simulation of a one layer static scheme and in FIG. 14 for the simulation of a three layer static scheme.

In the above-described dynamic layering schemes, the data put into the different layers is preferably orchestrated to ensure that receivers can in fact recover all of the transmitted content without receiving duplicated data or with minimal duplicated data. In practice, this can be very difficult to achieve. Where content must be distributed reliably, the layering mechanisms and congestion control techniques described above can be combined with the coding taught in Luby I and/or Luby II to accomplish reliable content distribution with negligible duplicated data overhead.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a network supporting packet multicasting from a sender into the network, where hosts join and leave a multicast group by sending join and leave messages, respectively, to an access device in the network, an improvement comprising:

a plurality of layers, wherein a layer is a logical channel that carries packets for the multicast group;

logic, within the access device, for distributing multicast traffic from the sender over the plurality of layers according to a sending rate associated with each of the plurality of layers;

logic for accepting join and leave messages at the access device from the hosts, wherein the join and leave messages are associated with one or more layers of the plurality of layers; and logic for reducing the sending rate of at least one of the plurality of layers over time independent of receiver feedback.

2. The network of claim 1 further comprising logic for raising the sending rate of an unused layer.

3. In a network supporting packet multicasting from a sender into the network, where hosts join and leave a multicast group by sending join and leave messages, respectively, to an access device in the network, a method comprising the steps of accepting multicast join messages at the access device, wherein a join message indicates that a host beyond an interface to the access device requests membership in a layer, where a layer is a logical channel over which packets are multicast to hosts that are members of a multicast group for the layer;

transmitting multicast packets to a plurality of layers, wherein multicast packets are transmitted by the sender on a given layer at a rate approximately equal to a sending rate associated with the layer;

accepting multicast leave messages at an access device from hosts, wherein a leave message indicates that a host requests removal from a layer indicated in the leave message; and reducing the sending rates monotonically for each of the layers over time independent of receiver feedback, thereby reducing a reception rate of a host that is joined to a fixed set of layers.

4. The method of claim 3, further comprising a step of offsetting a reduced reception rate at a host due to a reduced sending rate for each of the layers by the host joining one or more additional layers, if a reception rate at the host is to be maintained.

5. The method of claim 3, wherein the step of reducing the sending rates includes reducing the sending rate for a selected one of the layers to zero.

6. The method of claim 5, further comprising a step of increasing the sending rate for the selected one of the layers after an idle period has elapsed.

7. The method of claim 6, wherein the idle period is longer than a leave latency associated with the access device responding to a leave message.

8. In a network supporting packet multicasting from a sender into the network, wherein hosts join and leave a multicast layer by sending join and leave messages, respectively, to an access device in the network, a method comprising the steps of:

transmitting multicast packets to a plurality of dynamic layers at a rate approximately equal to an aggregate sending rate;

reducing a sending rate monotonically for a first one of the plurality of dynamic layers over time independent of receiver feedback; and concurrently with the step of reducing the sending rate monotonically, increasing a sending rate of at least one other of the plurality of dynamic layers, thereby maintaining the aggregate sending rate for the plurality of dynamic layers.

9. The method of claim 8, wherein a host connected to the network is able to maintain a reception rate over time by joining the at least one other dynamic layer.

10. The improvement of claim 1, wherein the logic for accepting join and leave messages receives join messages from hosts attempting to maintain a reception rate at the host whereby the host joins one or more additional layers to maintain the reception rate and offset reduced reception rates at a host due to a reduced sending rate for each of the layers.

11. The improvement of claim 1, wherein the logic for reducing the sending rate operates to reduce the sending rate of at least one of the plurality of layers independent of congestion.

12. The improvement of claim 1, wherein the logic for accepting join and leave messages receives join messages from hosts attempting to maintain a reception rate at the host whereby the host joins one or more additional layers to maintain the reception rate and offset reduced reception rates at a host due to a reduced sending rate for each of the layers and wherein the logic for reducing the sending rate operates to reduce the sending rate of at least one of the plurality of layers independent of congestion.

* * * * *